United States Patent [19]

Wieland et al.

[11] Patent Number: 4,927,433
[45] Date of Patent: May 22, 1990

[54] APPARATUS FOR REMOVING GAS FROM A LIQUID

[75] Inventors: Rolf H. Wieland, Norristown; Martin A. Krongold, Aston, both of Pa.

[73] Assignee: MG Industries, Valley Forge, Pa.

[21] Appl. No.: 355,192

[22] Filed: May 22, 1989

[51] Int. Cl.[5] .......................................... B01D 19/00
[52] U.S. Cl. ......................................... 55/18; 55/48; 55/53
[58] Field of Search ................... 55/48, 46, 47, 53, 18, 55/52, 90, 270, 196, DIG. 34

[56] References Cited

U.S. PATENT DOCUMENTS

| | | | |
|---|---|---|---|
| 2,108,976 | 2/1938 | Vincent | 55/53 |
| 2,136,774 | 11/1938 | Hickman | 55/53 |
| 2,953,306 | 9/1960 | Dijkstra | 239/407 |
| 3,193,257 | 7/1965 | Kingma | 259/4 |
| 3,334,657 | 8/1967 | Smith | 137/604 |
| 3,498,028 | 3/1970 | Trouw | 55/237 |
| 3,653,641 | 4/1972 | Eron | 261/18 |
| 3,944,635 | 3/1976 | Siegenthaler | 261/62 |
| 3,977,254 | 8/1976 | Brouwer | 55/270 |
| 4,054,619 | 10/1977 | Coverston | 261/24 |
| 4,374,813 | 2/1983 | Chen et al. | 55/90 |
| 4,675,165 | 6/1987 | Kückens | 422/261 |
| 4,683,122 | 7/1987 | Concordia | 472/227 |
| 4,698,076 | 10/1987 | Bekedam | 55/196 |
| 4,735,750 | 4/1988 | Damann | 261/29 |
| 4,755,195 | 7/1988 | Compton et al. | 55/53 |

FOREIGN PATENT DOCUMENTS 38760 10/1976 Japan ....................................... 55/196

Primary Examiner—Bernard Nozick
Attorney, Agent, or Firm—William H. Eilberg

[57] ABSTRACT

This invention is a method for removing dissolved gas from a liquid. The liquid is directed into a container, and is atomized upon entry. At the same time, a relatively inert gas is also directed into the container, so as to contact the atomized droplets. The addition of the inert gas to the container alters the relative partial pressure of the dissolved gas, especially when gas of the same type has been previously removed from the interior of the container. The result is that both the dissolved gas and the inert gas tend to vent from the container. The droplets of atomized liquid settle towards the bottom of the container, to form a pool of liquid. This liquid can then be withdrawn from the container. The liquid leaving the container can also be analyzed for its dissolved gas content. If the output liquid is not sufficiently degassed, the rate of flow of inert gas into the container is increased. Increasing the flow of inert gas into the container reduces the dissolved gas content of the output liquid. It is also possible to extract residual moisture from the gas being vented from the container, and to recycle that mositure to the container.

4 Claims, 1 Drawing Sheet

APPARATUS FOR REMOVING GAS FROM A LIQUID

BACKGROUND OF THE INVENTION

This invention deals with the removal of dissolved gas from liquids. It is especially intended for use in removing dissolved oxygen from water or from other liquids.

It is necessary to remove substantially all dissolved oxygen from water used in a polymerization process. Also, it is desirable to remove dissolved oxygen from liquids used in the food industry, such as vegetable oils and other liquids. Dissolved oxygen will react with other substances, and therefore tends to reduce the shelf life of foods.

It has been known to remove dissolved oxygen from a liquid by bubbling a relatively inert gas, such as nitrogen, into the liquid. The size and flow rate of the bubbles determines the efficiency and rate of gas removal. The disadvantage of the latter method is that the effective area of contact between the gas and the liquid is relatively low, so that the degassing process is not very efficient. Also, the gas bubbles tend to clump together, further reducing the effective contact area between the gas and the liquid, and reducing the efficiency of the process.

The present invention provides a simple, economical, and efficient means of removing dissolved gas from a liquid. The invention enables one to remove virtually all the dissolved gas from the liquid, or to adjust the amount of dissolved gas to an acceptable level.

SUMMARY OF THE INVENTION

According to the process of the present invention, a liquid containing dissolved gas is directed into a container. Preferably, the container itself is substantially free of the gas which is to be removed from the liquid. As the liquid enters the container, it is made to pass through an atomizer, so that all the liquid enters the container in the form of tiny droplets. At the same time, a relatively inert gas, preferably nitrogen, is directed into the container so as to contact the droplets of liquid. The nitrogen added to the container alters the relative partial pressure of the dissolved gas, and causes the dissolved gas to separate from the droplets and to vent from the container, together with the inert gas.

The gas vented from the container can be passed through a drier which removes moisture from the vented gas. The moisture can then be recycled to the container, while the dried gas is vented.

The degassed liquid droplets settle at the bottom of the container, and form a liquid bath. The liquid can be withdrawn by a valve located at or near the bottom of the container.

The apparatus can also include a dissolved-gas analyzer for determining the amount of dissolved gas remaining in the output liquid. If the percentage of dissolved gas is greater than the desired level, the flow of nitrogen into the container is increased, so as to drive out more dissolved gas from the liquid entering the container. Preferably, a signal from the analyzer is used to control a valve which regulates the flow rate of nitrogen entering the container.

It is therefore an object of the invention to provide an apparatus and method for removing dissolved gas from a liquid.

It is another object to provide an apparatus and method as described above, wherein the degree to which gas is removed from the liquid can be easily regulated and automatically controlled.

It is another object to provide water which is substantially free of oxygen, for use in a polymerization process.

It is another object to provide an efficient means of removing dissolved oxygen from water and/or other liquids.

It is another object to increase the efficiency of the removal of dissolved gas, especially oxygen, from liquids.

It is another object to increase the shelf life of food products, by providing an efficient means of removing dissolved oxygen from liquids used in connection with foods.

Other objects and advantages of the invention will be apparent to those skilled in the art, from a reading of the following brief description of the drawings, the detailed description of the invention, and the appended claims.

DETAILED DESCRIPTION OF THE INVENTION

Although the description may sometimes refer to the gas being removed from the liquid as oxygen, and may refer to the inert gas as nitrogen, it is understood that the invention is not limited to the use of these gases, but also includes others.

Figure 1:
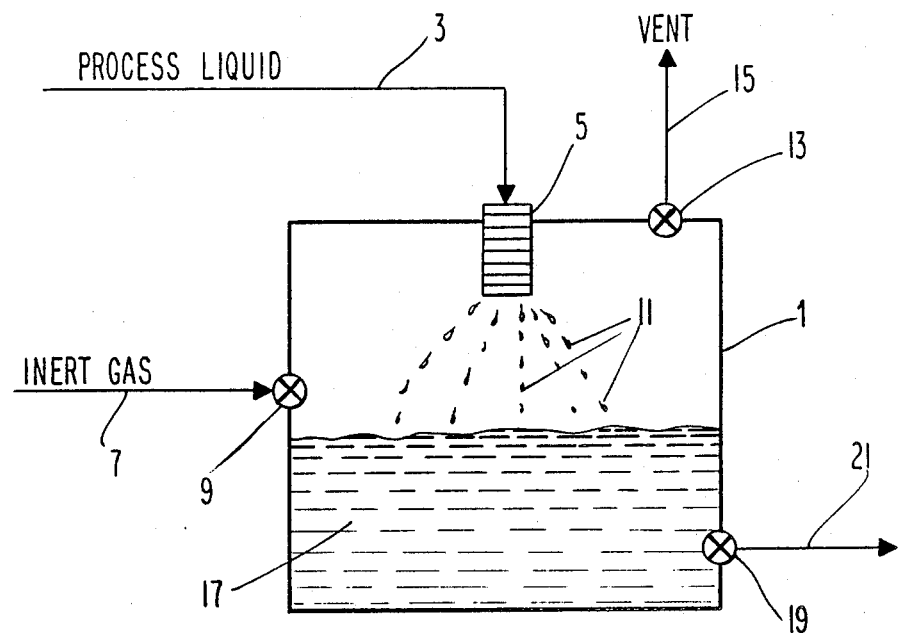
FIG. 1 is a schematic diagram of one embodiment of the apparatus of the present invention.

FIG. 1 is a schematic diagram showing one embodiment of the present invention. The liquid to be degassed is directed through conduit 3 into container 1. Atomizer 5 breaks the liquid into tiny droplets 11, the atomizer being positioned within an opening in the wall of the container, so that all liquid entering the container must first pass through the atomizer. The atomizer can be of any known construction, and can be ultrasonic, piezoelectric, or mechanical. The particular structure of the atomizer is not a part of this invention.

A relatively inert gas, preferably nitrogen, enters the container from conduit 7 and through valve 9. Adding nitrogen to the atmosphere in the container reduces the relative partial pressure of the dissolved gas. Stated another way, in the case where the dissolved gas is oxygen, the addition of nitrogen creates an oxygen-deficient atmosphere in the container, and the partial pressure of oxygen in the general interior region of the container is less than the partial pressure in the immediate vicinity of the droplets. Thus, the liquid droplets tend to give up their dissolved oxygen, due to this pressure imbalance, and both the oxygen and the added nitrogen vent from the container, through valve 13 and vent line 15.

The droplets which have given up their oxygen settle to the bottom of the container to form liquid bath 17. The contents of the bath are then withdrawn through valve 19 and output conduit 21. The degassed liquid can be withdrawn continuously, or batches of the liquid can be withdrawn periodically.

It is preferred that the container itself be substantially free of the gas which is to be removed from the liquid. For example, if the gas to be removed is oxygen, it is preferred that the interior of the container be free of oxygen before the liquid is introduced. It is not absolutely necessary that all of the gas be so removed, but the more such gas is removed, the more efficient the operation of the process.

The degree to which oxygen, or other dissolved gas, is removed from the liquid depends on the amount of nitrogen, or other inert gas, introduced into the container. For a fixed flow rate of liquid in conduit 3, the greater the flow of nitrogen, the greater the pressure imbalance described above, and the greater the tendency of the dissolved oxygen to vent from the container. Thus, the degree of completeness of the degassing process can be regulated by controlling the flow rate of the nitrogen.

Note that there is no particular requirement that the nitrogen be introduced at a high pressure, provided that the mass flow rate is sufficiently great relative to the flow rate of the incoming liquid. The nitrogen does not drive dissolved gas out of the liquid by direct physical force, but only causes the dissolved gas to separate naturally from the liquid due to the pressure imbalance described above.

Figure 2:
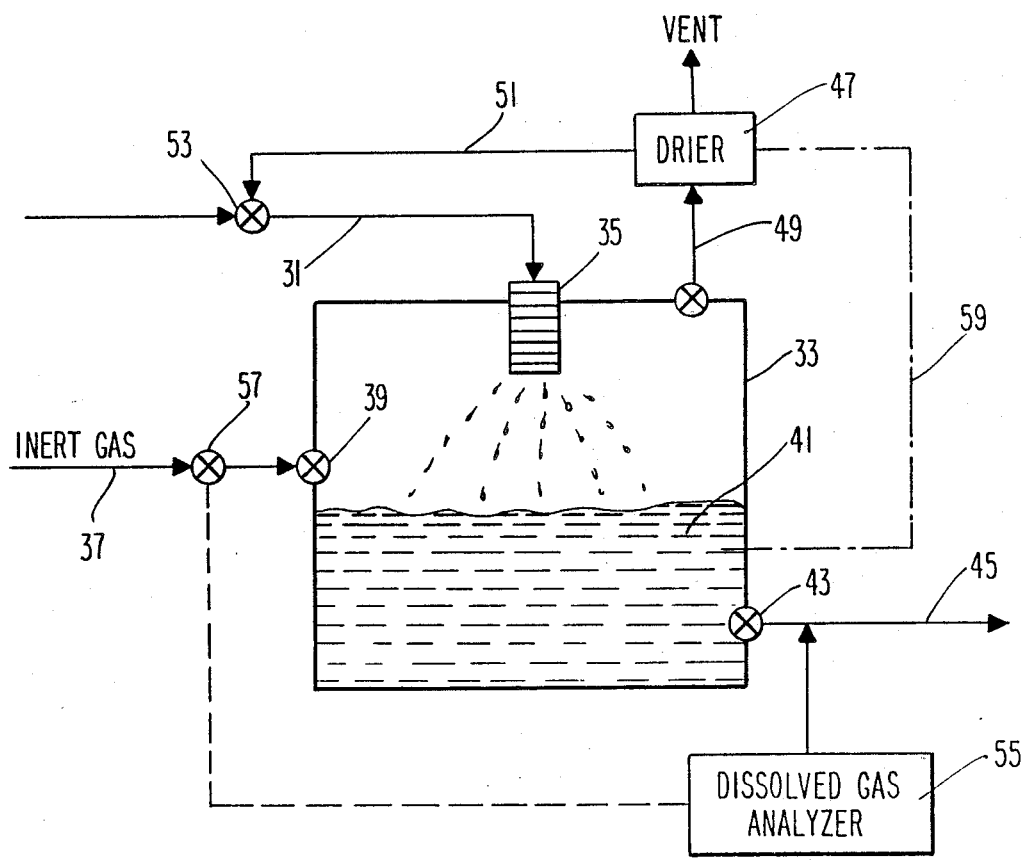
FIG. 2 is a schematic diagram of another embodiment of the apparatus of the invention.

FIG. 2 is a schematic diagram of another embodiment of the invention, this embodiment containing further enhancements. As before, the liquid to be degassed is directed through conduit 31, through atomizer 35, and into container 33. An inert gas, such as nitrogen, is directed into the container through conduit 37 and valve 39. The liquid in bath 41 is withdrawn through valve 43 and output conduit 45.

The apparatus of FIG. 2 also includes drier 47 disposed in vent line 49. The drier can be of any known construction; its particular structure is not critical to the invention. The drier removes moisture from the vented gas, and the moisture can be returned to the apparatus by two alternative means. In one alternative, the recovered moisture flows through conduit 51, and back to conduit 31, through valve 53. In the other alternative, the recovered moisture flows directly into bath 41, through conduit 59. The second alternative can be used if the liquid leaving the drier is substantially free of dissolved gas. Both alternatives are shown in FIG. 2, but it is understood that only one would be used at one time. With either alternative, the liquid that would otherwise be vented along with the gas, and lost to the system, is recycled.

The apparatus of FIG. 2 also includes means for varying the degree to which the liquid is degassed. Analyzer 55 is connected to sample the contents of output conduit 45, and indicates the amount of dissolved gas remaining in the output liquid. Analyzer 55 can be of any known construction; dissolved gas analyzers are commercially available. The analyzer controls valve 57, which regulates the flow of nitrogen into the container. If the analyzer determines that there is too much gas dissolved in the liquid in the output conduit, it causes valve 57 to open further, thereby increasing the amount of nitrogen entering the container per unit time. Conversely, if one wants the degassing process to be less complete, the analyzer can cause valve 57 to close somewhat, to reduce the flow of nitrogen into the container.

As explained above, increasing the flow of nitrogen (or other inert gas), relative to the flow of incoming liquid, causes more dissolved gas to be removed. If all the dissolved gas is being removed from the liquid stream, the addition of more nitrogen will have no further effect. Thus, the liquid leaving the container can be made substantially totally free of dissolved gas, simply by increasing the flow rate of nitrogen.

The features of the embodiment of FIG. 2, represented by drier 47 and analyzer 55, need not both be present. It is possible to use the drier 47 without using the analyzer, or vice versa. Both alternatives are within the scope of the invention.

Although the most common dissolved gas to be removed from the incoming liquid is oxygen, the invention can also be used to remove virtually any other dissolved gases. For example, it may be necessary, in certain applications, to remove carbon dioxide from a process liquid. If the dissolved carbon dioxide, which is normally fairly inert, is likely to react with substances that are expected to come into contact with the liquid, it is desirable to remove the carbon dioxide at the earliest possible stage.

The preferred type of inert gas is nitrogen, which remains substantially inert at room temperature, and which is inexpensive. But it is possible to use other inert or noble gases instead of nitrogen.

The invention is relatively easy and inexpensive to operate, because it requires only the continuous introduction of process liquid and inert gas. There is no requirement that the inert gas be highly pressurized. The only requirement is that the pressure of the inert gas be sufficient to cause a flow that is capable of removing as much dissolved gas as desired. The required pressure and flow rate of the nitrogen are therefore virtually infinitely variable, and depend on the flow rate of the incoming liquid, and on how much of the dissolved gas is to be removed.

While the invention has been described with respect to particular embodiments, it is understood that other variations are possible. The invention can be used with many types of gases, and the specific components used in the apparatus can be modified. Such variations should be deemed within the spirit and scope of the following claims.

What is claimed is:

1. A process for removing za gas from a liquid, the gas being initially dissolved in the liquid, the method comprising the steps of:
   (a) directing the liquid to an opening in a container, the opening having an atomizer mounted therein, such that the liquid entering the container is substantially atomized,
   (b) introducing an inert gas into the container, the inert gas being introduced in sufficient quantity to cause the dissolved gas to separate from the liquid,
   (c) venting gas from the container,
   (d) permitting the degassed atomized liquid to accumulate at the bottom of the container,
   (e) withdrawing at least some of the liquid from the container,
   (f) measuring the amount of dissolved gas remaining in the liquid being withdrawn from the container, and
   (g) adjusting the flow rate of inert gas into the container, until the amount of dissolved gas in the liquid being withdrawn from the container has reached a desired level.

2. The process of claim 1, further comprising the steps of drying the gas vented from the container, and returning moisture obtained from the drying step to the container.

3. The process of claim 1, wherein the directing step is preceded by the step of removing at least some gas from the interior of the container, the gas being removed from the interior being the same composition of gas which is to be removed from the liquid.

4. The process of claim 1, wherein the venting step comprises the steps of removing liquid from the gas leaving the container, and returning said liquid to the atomizer.

* * * * *